Nov. 2, 1965  L. W. HAHN  3,214,828
AUTOMATIC MACHINE FOR ASSEMBLING BATTERY ELEMENTS
Filed Dec. 3, 1963  3 Sheets-Sheet 2
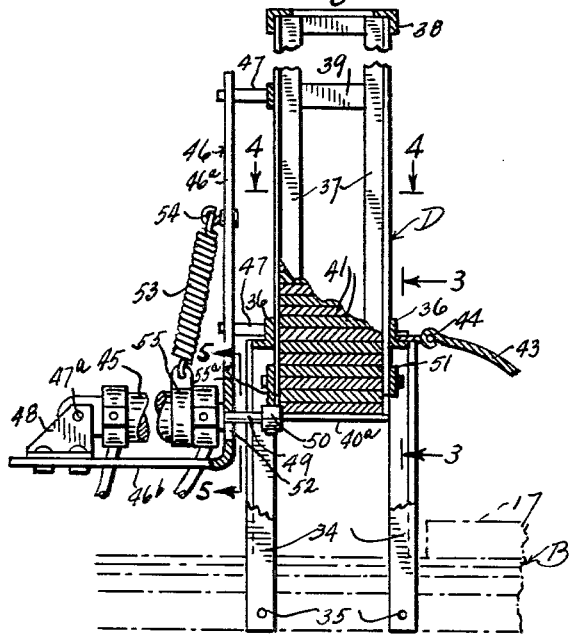
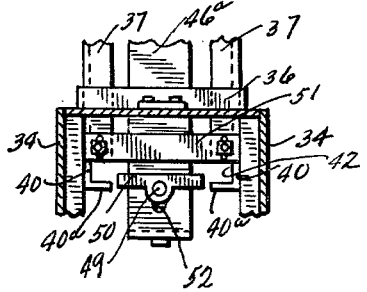
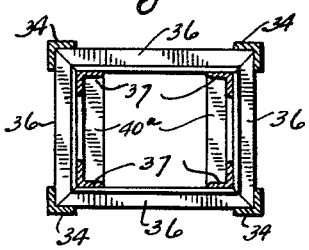
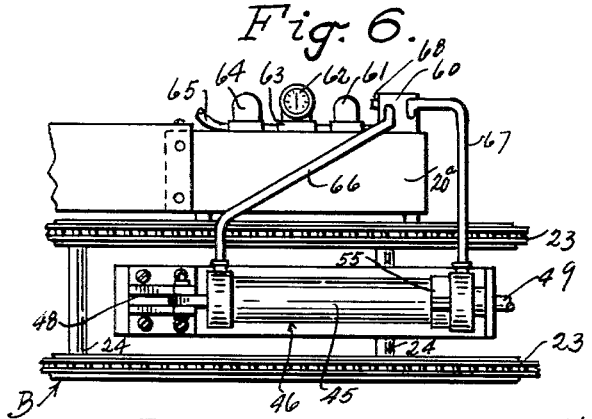
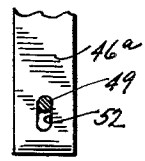
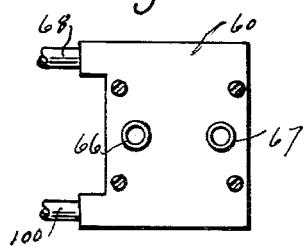
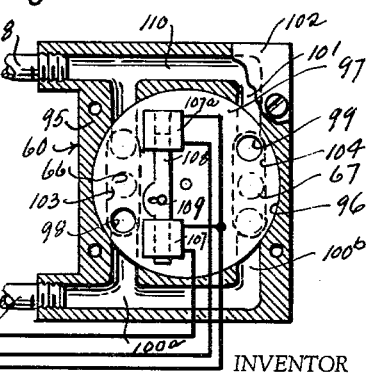
INVENTOR
LAURENCE W. HAHN.
BY
ATTORNEYS

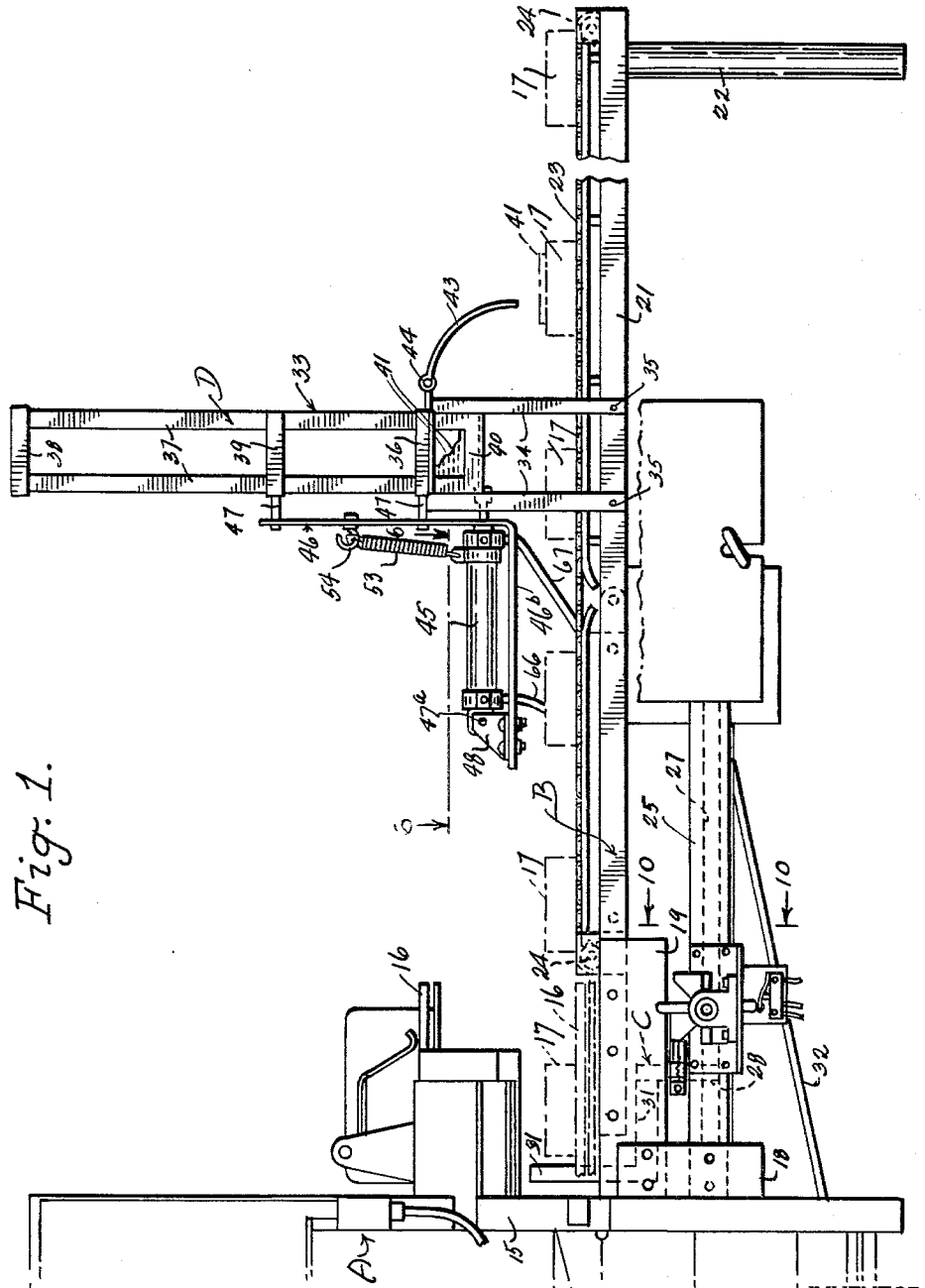

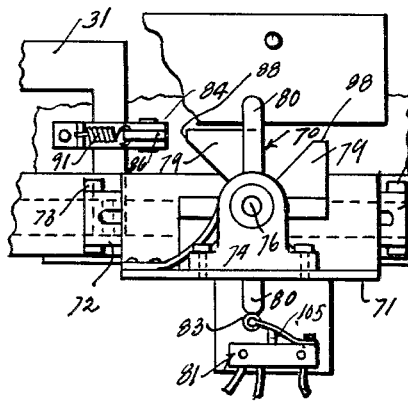

United States Patent Office 3,214,828
Patented Nov. 2, 1965

3,214,828
AUTOMATIC MACHINE FOR ASSEMBLING
BATTERY ELEMENTS
Laurence W. Hahn, Tampa, Fla., assignor to Contract Battery Mfg. Co., Tampa, Fla., a corporation of Florida
Filed Dec. 3, 1963, Ser. No. 327,781
12 Claims. (Cl. 29—204)

This invention relates to apparatus for selected placement of battery cell group spacers to facilitate storage battery assemblage.

As shown in United States Patent No. 2,908,377, dated October 30, 1959, it is old to automatically provide unitary separated stacks of battery components, each consisting of positive and negative battery plates and their separators. The machine of this patent delivers independent stacks of plates and separators in predetermined number to the delivery end of the machine where they are received by workers who manually separate the stacks one from the other by placing spacing elements between the adjacent stacks. This enables a predetermined number of the stacks to be quickly selected for a battery of predetermined voltage. It is a primary object of this invention to provide improved means and apparatus for placing the spacers automatically upon recurrent or alternate stacks of battery cell groups. This eliminates the manual assembly work presently necessary; the battery cells, groups, and their spacers being conveniently arranged so that the stacks can be superposed in desired number to suit the voltage requirements of the battery being assembled.

A further object of this invention is the provision of automatic means for dispensing spacers upon a moving line of battery cell groups in combination with the machine which assembles battery elements into cell groups whereby the cell group automatic machine and the spacer apparatus cooperate to quickly and efficiently and accurately separate battery cell groups one from the other.

Other objects and advantages of this invention will be apparent during the course of the following detailed description.

In the accompanying drawings, forming a part of this specification, and wherein similar reference characters designate corresponding parts throughout the several views:

FIGURE 1 is a side elevation of the improved apparatus for automatically placing battery cell group spacers; the apparatus being shown in cooperative connected relation with apparatus for forming the battery components or cell groups as described in United States Patent 2,908,-377, dated October 30, 1959.

FIGURE 2 is a fragmentary cross-sectional view showing a magazine type of dispenser and cooperating parts for the controlled dispensing of spacers onto the stacks of battery cell groups as they pass along a conveyor line.

FIGURES 3, 4, and 5 are cross-sectional views taken substantially on their respective lines 3—3; 4—4; and 5—5 of FIGURE 2 of the drawings.

FIGURE 6 is a fragmentary plan view of a portion of the operating means for dispensing the spacer plates from the magazine shown in FIGURE 2, taken on the line 6—6 of FIGURE 1.

FIGURE 7 is an external view of a solenoid operated air valve adapted to control a pneumatically operated piston of an ejector which dispenses the spacer plates in selected relation upon the stacks of battery cell groups as they are moved along a conveyor line.

FIGURE 8 is a cross-sectional diagrammatic view showing the details of the solenoid operated air valve of FIGURE 7.

FIGURE 9 is a fragmentary side elevation of the switch assembly which controls the dispensing action of the battery cell group spacers.

FIGURE 10 is a fragmentary view partly in cross-section taken substantially on the lines 10—10 of FIGURE 1 showing more particularly the switch mechanism of FIGURE 9 and also a transfer means for moving the battery cell groups from the apparatus of U.S. Patent 2,908,377 onto conveyor assembly of the spacer plate dispensing means.

FIGURE 11 is a plan view, partly in cross-section, taken substantially along line 11—11 of FIGURE 10.

FIGURES 12 and 13 are cross-sectional views taken substantially on their respective lines 12—12 and 13—13 of FIGURE 10 of the drawings, showing more details of a switch mechanism.

Referring to the battery component forming apparatus A as shown in U.S. Patent 2,908,377, the same at its delivery and includes a framework 15 and a vertically movable platform 16 onto which the cell groups are moved by the machine A. The platform 16 has mechanism (shown in Patent 2,908,377) which delivers the cell groups onto the platform 16 shown in the full line position in FIGURE 1; the platform 16 then being lowered to the ejecting position shown at 16 in dot-and-dash lines in FIGURE 1. The battery plates and plate separators comprising a cell group 17, after the platform 16 is lowered, rest on said platform in the position shown by the dot-and-dash lines in FIGURE 1, from which position the group is moved onto the conveyor assemblage B as will be subsequently described.

At the discharge end of the machine A are two supporting plates 18 secured to frame 15 shown in FIGURES 1 and 10 and bolted to the plates 18 are two conveyor supporting plates 19 and 20 (see FIGS. 1 and 10). The conveyor assembly B comprises a frame 21 having a forward standard support at 22 and at its rear end it is connected in any approved manner to plates 19 and 20. The conveyor assembly B includes conveyor chains 23 shown in FIGURES 1 and 6 which are trained over pulleys 24. Frame 21 has suitable cross-reinforcement. It will be noted that the upper treads of the chains 23 lie flush with the top of the lowered vertically movable platform 16 of the cell group forming machine A, as shown in dot-and-dash lines in FIGURE 1.

The transfer means C to move the groups from the machine A to the conveyor B comprises horizontal beam members 25 and 26 secured to the support plates 18, 19 and 20 and to other depending structure of the frame 21 of conveyor B. The inner surface of the beam 26 is horizontally channelled at 27 (see FIG. 10) to slidably receive a transfer member horizontal support 28. The support member 28 is retained in place in the channel 27 of the beam 26 by means of keepers 29 as shown in FIGURE 10. Welded to the inner side of member 27 is a horizontal extension 30 which supports a transfer arm structure 31. This arm 31 extends upwardly from its connection with the horizontal portion 30 and thence horizontally rearwardly and thence upwardly as shown in full and dotted lines in FIGURE 1 of the drawings. The transfer arm 31 is actuated by means of an inclined connecting rod 32 (see FIG. 1) which at its forward end is connected (see FIG. 11) to the slidable support 28 and at its rear end it is connected to an operating mechanism of the machine A (not shown). This operating mechanism comprises a cam operated wheel to which the rod 32 is eccentrically connected.

The vertically movable platform 16 is intermittently lowered and elevated. It receives battery plates and separators which make up the groups 17. When the platform 16 reaches the lowered dot-and-dash position shown in FIGURE 1 the cam operated wheel of rod 32 pushes the slidable support 28 forward. The transfer arm 31 is thus moved into engagement with the group 17 on the lowered platform 16 and slides it onto the moving chains 23 of conveyor B. The transfer arm just as quickly returns to its former position due to operating connection with the machine A and the vertically movable platform 16 is then raised to its original position ready for another cycle of operation in receiving cell units.

Referring to the dispenser assemblage B the same comprises a magazine tower 33 comprising four lower angle steel posts 34 which at their lower ends are secured, two at each side of the conveyor, at 35 to the conveyor frame 21. At their upper ends posts 34 have welded thereto four horizontal angle pieces 36 secured at the inner sides of the steel posts 34, as shown in FIGURES 1, 2, 3, and 4. The magazine 33 furthermore includes four vertical angle standards 37 welded to the inner legs of the angle pieces 36, as shown in FIGURE 4. The tops of these standards 37 are secured together by horizontal angle pieces 38 and intermediate their ends, between the angle pieces 36 and 38, they are secured together in reinforced relation by plates 39. The frame standards 37 at their extreme lower ends have welded thereto side horizontal angle pieces 40 the lower legs 40$^a$ of which lie in a horizontal plane to retain a column of wood spacers 41 within the magazine framework above described. The lower ends of the standards 37 of the magazine terminate short of the separator supporting flanges 40$^a$ of angle pieces 40, as shown in FIGURE 3 to define a guide way 42 through which the separators 41 are moved by means to be subsequently described for the purpose of ejecting them onto alternate cell groups 17. The dispenser D is provided with a deflector 43 to prevent the spacers 41 from overshooting the intended position, enabling them to accurately fall upon the cell group 17. The deflector 43 if desired may be made laterally adjustable at 44.

Referring to the means for recurrent ejection of the spacer plates 41, a pneumatic cylinder 45 is provided, mounted on an L-shaped bracket 46 which is attached by members 47 to the cross-pieces 36 and 39 of the magazine 33 as shown in FIGURE 1. This bracket 46 includes a vertical leg 46$^a$ and a horizontal leg 46$^b$. Cylinder 45 is pivoted at 47$^a$ on a bracket 48 mounted on the shelf portion 46$^b$ of bracket 46. The cylinder is substantially horizontally positioned and receives a piston (not shown) therein to which a piston rod 49 is connected. Piston rod 49 at its outer end has a pusher bar 50, shown in FIGURES 1, 2 and 3 of the drawings, adapted to slide cross-wise at the lower open end of the magazine 33 for the purpose of ejecting the lowermost spacer plate 41. The lowermost spacer plate 41 rests on the horizontal sides 40$^a$ of the bottom angle members 40; the slot 42 being opened to enable ejection of the spacer plate 41. An adjustable gate 51 on the magazine frame, as shown in FIGURE 2, prevents more than one wood spacer 41 from being ejected at any time. The vertical portion 46$^a$ of bracket 46 has a vertically elongated slot 52 therein, shown in FIGURES 2 and 5, through which the piston rod 49 extends. A spring 53 attached at its upper end 54 to the vertical portion 46$^a$ of bracket 46 is also connected by a clamp 55 to the movable end of the pneumatic cylinder 45. The spring is biased to normally urge the piston rod 49 against the upper portion of the slot 52 in the cross-hatched position shown in FIGURE 5. When the plunger of the pneumatic cylinder has ejected a spacer plate 41 the weight of all the remaining wood spacers in the magazine forces the rod 49 and also the pusher bar 50 downwardly a distance equal to the thickness of one wooden spacer 41. As the piston rod 49 is retracted pusher bar 50 slides along the lower surface of the now lowermost wooden spacer 41 which has fallen into the space formerly occupied by the spacer which has been ejected. As the piston rod 49 retracts the pusher bar 50 is raised by the spring 53 to a position beyond the next lowermost wood spacer. The pusher bar 50 is prevented from rotating by stops 55$^a$ attached to the magazine 33.

The supporting plate 20 (see FIG. 11) of the framework above described has a horizontal supporting portion 20$^a$ as shown in FIGURES 6 and 10 upon which is mounted a solenoid operated valve 60, a metering oiler 61 to lubricate the pneumatic cylinder piston, a pressure gauge 62, a pressure regulator 63 and an air filter 64 all of which have air furnished to them by an air supply line 65. The pneumatic cylinder 45 receives air from the valve 60 through supply line 66 for the purpose of pushing the piston and piston rod 49 outwardly, thereby expelling a wood spacer 41 which falls onto the passing stack 17 of lead plates. Air pressure is maintained in hose 66 by the valve mechanism 60 until another battery plate and separator group is pushed onto the conveyor by the transferred system C, at which time a switch controlled mechanism 70 operates the valve 60 and permits air to exhaust through line 67 and exit at 68, to the atmosphere.

The switch assembly 70 shown in FIGURES 1, 9, 10, 11, 12, and 13 of the drawings is mounted on a shelf 71 of a bracket which is end-wise adjustably fastened to slotted bracket 72 welded to stand off spacers 73 which in turn are welded to the supporting beam 25 (see FIGURES 9 and 10). Bolted to the shelf 71 is a pair of bearings 74 and 75 supporting a shaft 76. Rigidly attached to shaft 76 is a welded rotary switch arm assembly 77 (see FIGURE 13) consisting of a hub 78 mounted on the shaft 76. Welded to hub 78 are four triangular members 79 and two contact arms 80. A micro-switch 81 is mounted at 82 upon the shelf 71. The switch arms 80 are diametrically opposed to each other and they are the only ones which engage the spring bracketed roller 83 to actuate the micro-switch 81.

The means for operating the switch arm assembly 77 includes a supporting arm 84, shown in FIGURE 10 which is clamped at 85$^a$ to transfer arm 31. The outer end of the supporting arm 84 is slotted at 85 to receive an arm 86 pivoted at 87$^a$ on the arm 84. As the transfer arm 31 moves to slide a group 17 of battery plates and separators onto the conveyor chains 23 the arm 84 is also moved. The pivoted arm 86 at its forward edge 87 strikes the uppermost triangular member 79 at a point 88. This carries the triangular member 79 around one-fourth of a revolution in a clock-wise direction as viewed from FIGURES 9 and 13. At the end of its stroke the direction of arm 84 is reversed due to the above-described return movement of the transfer member 31, and pivoted arm 86 strikes its rear edge 89 against the edge 90 of the switch arm assembly 77 causing arm 86 to pivot counterclockwise as shown in the dotted lines in FIGURE 11. As the return stroke continues it carries the pivoted arm 86 past the switch arm assemblage 77. At this time the spring 91 which has been placed under tension returns the arm 86 to the full line position shown in FIGURE 11, against a stop 92.

A ratchet gear 93 is keyed on shaft 76. A spring detent 94 mounted on the framework of the machine prevents the shaft 69 from overrunning its normal movement of one-fourth revolution. Every other time the transfer arm 31 moves a group of battery plates and separators onto the conveyor chains 23 and only then do the arms 80 of switch arm assembly 77 make contact with the micro-switch of the solenoid valve 60 which is electrically operated to direct a stream of air into the cylinder 45. Since the transfer arm 31 periodically moves the groups 17 onto the conveyor B and since the switch arm assembly 77 has only two operating switch arms 80 it can be seen that spacers 41 are dispensed only on alternate groups 17.

One form of solenoid actuated air valve 60 is shown in FIGURES 7 and 8. It comprises a casing structure 95 having a circular depression 96 therein. Within this circular depression is mounted a rotatable disc 97, whose depth and diameter exactly matches depression 96. Disc 97 has two ports 98 and 99 therein which are shown respectively in alignment with intake channel 100ᵃ and exhaust channel 101. On the inner side of cover 102 of the casing 95 are relieved area 103 which leads to hose 66 and relieved area 104 which leads to hose 67. The disc 97 is rotatable within limits on its center. It is actuated by a solenoid shown in FIGURE 8. In operation the micro-switch 81 has its switch arm 105 held against contact 106. This energizes the solenoid coil 107 to magnetically position solenoid arm 108 as shown in FIGURE 8. Solenoid arm 108 is attached to a disc 97 by a pin 109. As the solenoid arm 108 moves back and forth on the magnetic urging of one of the other of the two coils 107 and 107ᵃ disc 97 is rotated within limits upon its center. When disc 97 is in the position shown in FIGURE 8 air under pressure is admitted to air supply pipe 100 and fills the channels 100ᵃ and 100ᵇ because the port 98 in the disc 97 is aligned with channel 100ᵃ. Air passes through port 98 into the relieved area 103 of the cover and into hose 66 and then to the air cylinder 45. Air from the other side of the piston in cylinder 45 is exhausted through hose 67 into the relieved area 104 of cover 102 and into exhaust channel 101 to be released into the atmosphere at 68.

As the contact arm 80 of the switch mechanism 70 depresses the micro-switch 81 switch arm 105, shown in FIGURE 8, is raised against contact 112. This energizes the solenoid coil 107ᵃ magnetically attracting solenoid arm 108 rotating disc 97 so the port 99 is aligned with channel 100ᵇ. Air passes from channel 100ᵇ through port 99 into relieved area 104 and into hose 67 and then to the air cylinder 45 which reverses the piston. The air from the other side of the piston in cylinder 45 is exhausted through hose 66 into relieved area 103 of cover 102 or into the exhaust channel to be released into the atmosphere.

The chain tread of conveyor B may be operated by means (not shown) synchronously connected for operation to the machine A in any approved manner so the movement of the tread will correspond to the periodic discharge of groups 17 from machine A onto the platform 16.

Various changes in the size, shape and arrangement of parts may be made to the forms of invention herein shown and described without departing from the spirit of the invention or scope of the claims.

I claim:

1. In combination with an automatic machine for assembling plate and separator battery elements into cell groups, a movable conveyor, means for placing cell groups from the automatic machine in uniformly spaced relation upon said conveyor for travel therewith, and means for automatically disposing group spacer members upon alternate cell groups as they travel with the conveyor.

2. The combination defined in claim 1 in which said last mentioned means comprises a magazine mounted adjacent to the conveyor having a column of cell group spacing members disposed therein, and automatic means connected for operation with the group placing means for periodically ejecting said spacing members onto said cell groups as they travel with said conveying means past said magazine.

3. In a machine to facilitate separation of cell groups of battery elements the combination of a movable conveyor, means for placing complete cell groups including positive and negative plates and separators in uniformly spaced relation on said conveyor for travel therewith, and means for automatically dispensing spacers upon said cell groups during travel of the conveyor whereby the cell groups and spacers can be stacked one upon the other in individually separated groups.

4. The combination defined in claim 3 in which said last mentioned means dispenses spacers upon only alternate cell groups carried upon said conveyor.

5. In combination with an automatic machine for assembling plate and separator battery elements into cell groups, a frame, a movable conveyor mounted on the frame, automatic means for moving said cell groups from the automatic machine onto said conveyor in uniformly spaced relation for travel with said conveyor, a magazine carried by the frame and disposed adjacent to the conveyor for periodically dispensing the spacing members from said magazine onto the tops of said groups as they move with said conveyor.

6. The combination as defined in claim 5 in which the last mentioned means dispenses the spacers on only alternate cell groups.

7. In a machine for automatically relatively spacing battery element cell groups, a supporting frame having conveyor movably mounted thereon, means for placing assembled cell groups in uniformly spaced relation upon said conveyor for travel therewith, a magazine mounted adjacent to said conveyor, spacer members stacked in said magazine, and means for automatically dispensing the spacer members from said magazine onto recurrent cell groups travelling with the conveyor.

8. In combination with an automatic machine for assembling battery elements into cell groups, a supporting frame, a conveyor movably mounted upon said supporting frame, transfer means for individually moving the assembled cell groups from the automatic machine aforesaid onto the moving conveyor for travel therewith, a spacer containing a magazine mounted upon said frame having a stack of spacers mounted therein, ejecting means for ejecting spacers individually from said magazine onto alternate cell groups travelling with said conveyor, and means connecting the ejection means with the transfer means for synchronous operation of the latter.

9. In combination with an automatic machine for assembling battery elements into cell groups, a supporting frame, a conveyor movably mounted upon said frame, means on the automatic machine for individually moving the cell groups after they are formed to a locus adjacent to said conveyor, transfer means operated by the last mentioned means for moving the groups from said locus onto the conveyor in relatively spaced relation thereon for movement therewith, dispensing means mounted on said frame, spacers carried by said dispensing means, ejecting means for ejecting the spacers upon said cell groups, and means operatively connecting said ejecting means with the cell group transfer means for synchronous operation of said ejecting means and transfer means.

10. The combination defined in claim 9 in which the ejecting means 30 is actuated to dispense a spacer on only alternate groups riding with the conveyor.

11. In combination with an automatic machine for assembling battery elements into cell groups, the combination of a conveyor including a supporting frame and horizontally positioned tread means movably mounted thereon, reciprocating transfer means for moving the groups from the automatic machine onto the tread means of said conveyor, a magazine mounted above the conveyor having a stacked arrangement of spacer members mounted therein, a pneumatically operated ejector for ejecting spacers in individual relation from the magazine onto alternate groups upon the conveyor, a solenoid actuated air valve for directing air into and discharging it with respect to said pneumatically operated means, and switch means operated by movement of the transfer means connected to said air valve for operation thereof.

12. In an automatic machine the combination of a supporting frame, an elongated horizontally positioned travelling conveyor movably mounted on said frame, means for periodically disposing battery cell groups on said conveyor in uniformly spaced relation, a magazine mounted on said frame over the conveyor, a stack of spacing members mounted in column formation in said magazine, ejecting means for ejecting the spacing members individually from the lower end of the stack in said magazine in the direction of the conveyor, and means cooperatively connected to the means which disposes the groups onto said conveyor and the ejecting means for periodically synchronizing the discharge of said spacing members onto alternate groups as they move with said conveyor.

References Cited by the Examiner

UNITED STATES PATENTS

| | | | |
|---|---|---|---|
| 2,296,479 | 9/42 | Nichols | 29—204 |
| 2,324,523 | 7/43 | Lund | 29—204 |
| 2,908,377 | 10/59 | Winkel et al. | 198—35 |

WHITMORE A. WILTZ, *Primary Examiner.*

THOMAS H. EAGER, *Examiner.*